United States Patent
Kang et al.

(10) Patent No.: US 11,609,961 B2
(45) Date of Patent: Mar. 21, 2023

(54) SEARCH METHOD AND APPARATUS FOR AN ELECTRONIC MAP, DEVICE AND MEDIUM

(71) Applicant: BAIDU ONLINE NETWORK TECHNOLOGY (BEIJING) CO., LTD., Beijing (CN)

(72) Inventors: Zhangqi Kang, Beijing (CN); Xiaomin Wang, Beijing (CN); Yingchao Shi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 72 days.

(21) Appl. No.: 17/280,074

(22) PCT Filed: Aug. 31, 2020

(86) PCT No.: PCT/CN2020/112422
§ 371 (c)(1),
(2) Date: Mar. 25, 2021

(87) PCT Pub. No.: WO2021/139183
PCT Pub. Date: Jul. 15, 2021

(65) Prior Publication Data
US 2022/0114226 A1    Apr. 14, 2022

(30) Foreign Application Priority Data

Jan. 8, 2020   (CN) .................. 202010017416.X (51) Int. Cl.
*G06F 16/9537* (2019.01)
*G06F 16/951* (2019.01)
(Continued)

(52) U.S. Cl.
CPC .......... *G06F 16/9537* (2019.01); *G06F 16/29* (2019.01); *G06F 16/951* (2019.01); *G06F 40/295* (2020.01); *H04W 4/022* (2013.01)

(58) Field of Classification Search
CPC ........ G06F 16/00; G06F 16/285; G06F 16/29; G06F 16/907; G06F 16/909; G06F 16/95;
(Continued)

(56) References Cited

U.S. PATENT DOCUMENTS

| 8,745,065 B2 | 6/2014 | Wang |
| 2010/0146436 A1* | 6/2010 | Jakobson ............. G09B 29/006 715/800 |

(Continued)

FOREIGN PATENT DOCUMENTS

| CN | 103345489 A | 10/2013 |
| CN | 105045935 A | 11/2015 |

(Continued)

OTHER PUBLICATIONS

International Search Report issued from the International Search Authority to Application No. PCT/CN2020/112422 dated Nov. 30, 2020, 5 pages.

(Continued)

*Primary Examiner* — Robert W Beausoliel, Jr.
*Assistant Examiner* — Cheryl M Shechtman
(74) *Attorney, Agent, or Firm* — Hunton Andrews Kurth LLP (57) ABSTRACT

Provided are a search method and apparatus for an electronic map, a device and a medium that relate to the field of electronic map technology. The implementation solution includes determining whether target search information input by a user is event-type search information; in response to the target search information being the event-type search information, extracting target event content from the target (Continued)

search information; and determining a target POI based on the target event content and event attribute information associated with a POI in the electronic map and using the target POI as a search result. The event attribute information includes at least event content.

15 Claims, 4 Drawing Sheets

(51) Int. Cl.
*G06F 16/29* (2019.01)
*G06F 40/295* (2020.01)
*H04W 4/021* (2018.01)

(58) Field of Classification Search
CPC .. G06F 16/951; G06F 16/953; G06F 16/9532; G06F 16/9535; G06F 16/9537; G06F 16/9538; G06F 40/295; G01C 21/3679; G01C 21/3682; G01C 21/38; G01C 21/3804; G01C 21/3807; G01C 21/3811; G01C 21/3863; G01C 21/387; G01C 21/3874
See application file for complete search history.

(56) References Cited

U.S. PATENT DOCUMENTS

| | | | | |
|---|---|---|---|---|
| 2012/0202525 | A1* | 8/2012 | Pettini | H04W 4/06 455/456.3 |
| 2014/0059060 | A1* | 2/2014 | Yang | G06F 16/29 707/754 |
| 2016/0132513 | A1* | 5/2016 | Lim | G06F 16/285 707/740 |
| 2016/0165417 | A1 | 6/2016 | Yang et al. | |
| 2017/0124116 | A1* | 5/2017 | League | G06F 16/29 |

FOREIGN PATENT DOCUMENTS

| | | | |
|---|---|---|---|
| CN | 105224660 | A | 1/2016 |
| CN | 107577819 | A | 1/2018 |
| CN | 108197198 | A | 6/2018 |
| CN | 108628943 | A | 10/2018 |
| CN | 109710710 | A | 5/2019 |
| CN | 110232160 | A | 9/2019 |
| CN | 110377676 | A | 10/2019 |
| EP | 3144828 | A1 | 3/2017 |
| JP | 2001282813 | A | 10/2001 |
| JP | 2007034466 | A | 2/2007 |
| JP | 2010009262 | A | 1/2010 |
| JP | 2015045985 | A | 3/2015 |
| WO | WO-2018057331 | A1 * | 3/2018 ............. G01C 21/32 |

OTHER PUBLICATIONS

Extended European Search Report, issued from the European Patent Office, to EP Application No. 20864287.6 dated May 3, 2022, 8 pages.
First Chinese Search Report, The State Intellectual Property Office of People's Republic of China, issued to CN Application No. 202010017416.X dated Jan. 8, 2020, 4 pages.
First Chinese Office Action, The State Intellectual Property Office of People's Republic of China, issued to CN Application No. 202010017416.X, dated Mar. 18, 2022, 12 pages.
First Japanese Office Action, Japan Patent Office, issued to JP Application No. 2021-516772, dated Apr. 8, 2022, 10 pages.

* cited by examiner

SEARCH METHOD AND APPARATUS FOR AN ELECTRONIC MAP, DEVICE AND MEDIUM

CROSS-REFERENCE TO RELATED APPLICATIONS

This application is a national stage application filed under 35 U.S.C. § 371 based on International Patent Application No. PCT/CN2020/112422, filed on Aug. 31, 2020, which claims priority to Chinese Patent Application No. 202010017416.X filed with the China National Intellectual Property Administration on Jan. 8, 2020, the disclosures of which are incorporated herein by reference in their entiretiesits entirety.

TECHNICAL FIELD

Embodiments of the present application relate to the field of data processing, for example, to an electronic map technology, and, in particular, to a search method and apparatus for an electronic map, a device and a medium.

BACKGROUND

An electronic map is a map stored and consulted digitally using the computer technology. In a method for storing information in an electronic map, generally vector graphics are stored in the map, the map can be scaled up or down, or rotated without affecting the display effect, and graphics on any scale and in any range can be output.

Currently, the retrieval service of an electronic map is relatively simple in that a user can search the map for only address information corresponding to a retrieval term input by the user.

SUMMARY

The following is a summary of the subject matters described herein in detail. This summary is not intended to limit the scope of the claims.

Embodiments of the present application provide a search method and apparatus for an electronic map, a device and a medium so that a POI in the electronic map can be searched for based on event-type search information and thus the search forms of the electronic map are enriched.

An embodiment of the present application discloses a search method for an electronic map. The method includes determining whether target search information input by a user is event-type search information; in response to the target search information being the event-type search information, extracting target event content from the target search information; and determining a target POI based on the target event content and event attribute information associated with a POI in the electronic map and using the target POI as a search result. The event attribute information includes at least event content.

The preceding embodiment has the following advantages or beneficial effects: Whether the target search information is the event-type search information is determined, and the POI service is provided for the event-type search information, so that the problem in which an electronic map cannot satisfy the requirements for retrieval of the holding location of an event is solved, the POI in the electronic map associated with the event-type search information can be obtained based on the event-type search information, and thus event-related location information can be displayed to the user.

In an embodiment of the present application, before determining whether the target search information input by the user is the event-type search information, the method further includes determining whether scraped web data is event-type web data; in response to the scraped web data being the event-type web data, extracting event attribute information and POI attribute information from the web data; and establishing an association between the POI in the electronic map and the extracted event attribute information based on the POI attribute information.

Accordingly, the preceding embodiment has the following advantages or beneficial effects: The web data is preliminarily screened so that the event-type web data is determined, web data not including event information is filtered out, and the retained web data includes valuable information. The association between the POI in the electronic map and the extracted event attribute information is established so that subsequently the POI corresponding to the event-type search information is determined based on the association.

In this embodiment of the present application, determining whether the scraped web data is the event-type web data includes determining that the web data is the event-type web data in response to detecting, based on template matching, that the scraped web data includes event information, time and location information; otherwise, determining that the web data is not the event-type web data.

Accordingly, the preceding embodiment has the following advantages or beneficial effects: Whether the web data is the event-type web data is determined based on template matching. In this manner, the web data is screened so that web data not including event information is filtered out, and the retained web data includes valuable information, facilitating extraction of the POI attribute information and the event attribute information from the web data.

In this embodiment of the present application, the event attribute information further includes event time.

Accordingly, the method further includes removing, in response to detecting that event time in one of pieces of event attribute information is earlier than the current time, the one of pieces of event attribute information or the association between the POI in the electronic map and the one of pieces of event attribute information.

Accordingly, the preceding embodiment has the following advantages or beneficial effects: Event attribute information or association that expires is removed so that expired information is removed in time. In this manner, the following problem is avoided: An expired POI result is still displayed when the user performs retrieval based on the event-type search information, misleading the user and affecting the user experience.

In this embodiment of the present application, before establishing the association between the POI in the electronic map and the extracted event attribute information based on the POI attribute information, the method further includes cross-validating a POI name, a POI city and a POI address in the POI attribute information; and in response to a validation failure, filtering out the POI attribute information.

Accordingly, the preceding embodiment has the following advantages or beneficial effects: Through cross-validation, the correspondence of each piece of information is further validated, the accuracy of each piece of information is ensured, and the accuracy of subsequent retrieval is ensured.

In this embodiment of the present application, determining the POI based on the target event content and the event attribute information associated with the POI in the electronic map includes using, in response to event content in one of pieces of event attribute information in the electronic map matching the target event content successfully, the POI associated with the one of pieces of event attribute information as the target POI.

Accordingly, the preceding embodiment has the following advantage or beneficial effect: The event attribute information is matched with the target event content so that the accuracy of the event-type POI is improved.

An embodiment of the present application discloses a search apparatus for an electronic map. The apparatus includes an information type determination module, a target event content extraction module and a search result determination module.

The information type determination module is configured to determine whether target search information input by a user is event-type search information.

The target event content extraction module is configured to extract, in response to the target search information being the event-type search information, target event content from the target search information.

The search result determination module is configured to determine a target POI based on the target event content and event attribute information associated with a POI in the electronic map and use the target POI as a search result. The event attribute information includes at least event content.

In this embodiment of the present application, the apparatus further includes a web data type determination module, an attribute information determination module and an association determination module.

The web data type determination module is configured to determine whether scraped web data is event-type web data.

The attribute information determination module is configured to extract, in response to the scraped web data being the event-type web data, event attribute information and POI attribute information from the web data.

The association determination module is configured to establish an association between the POI in the electronic map and the extracted event attribute information based on the POI attribute information.

In this embodiment of the present application, the web data type determination module includes a first determination unit and a second determination unit.

The first determination unit is configured to determine that the web data is the event-type web data in response to detecting, based on template matching, that the scraped web data includes event information, time and location information.

The second determination unit is configured to: otherwise, determine that the web data is not the event-type web data.

In this embodiment of the present application, the event attribute information further includes event time.

Accordingly, the apparatus further includes a removal module.

The removal module is configured to remove, in response to detecting that event time in one of pieces of event attribute information is earlier than the current time, the one of pieces of event attribute information or the association between the POI in the electronic map and the one of pieces of event attribute information.

In this embodiment of the present application, the apparatus further includes a cross-validation module and a filtering module.

The cross-validation module is configured to cross-validate a POI name, a POI city and a POI address in the POI attribute information.

The filtering module is configured to filter out the POI attribute information in response to a validation failure.

In this embodiment of the present application, the search result determination module includes a matching unit.

The matching unit is configured to use, in response to event content in one of pieces of event attribute information in the electronic map matching the target event content successfully, the POI associated with the one of pieces of event attribute information as the target POI.

An embodiment of the present application discloses an electronic device. The device includes at least one processor; and a memory connected to the at least one processor for communication.

The memory stores instructions executable by the at least one processor. The instructions, when executed by the at least one processor, cause the at least one processor to perform the method of any one of embodiments of the present application.

An embodiment of the present application discloses a non-transitory computer-readable storage medium storing computer instructions. The computer instructions are used for causing a computer to perform the method of any one of embodiments of the present application.

Other effects of the preceding optional implementations are described hereinafter in combination with embodiments.

Other aspects can be understood after the drawings and the detailed description are read and understood.

BRIEF DESCRIPTION OF DRAWINGS

The drawings are intended to provide a better understanding of the present solution and not to limit the present application.

DETAILED DESCRIPTION

Example embodiments of the present application, including details of embodiments of the present application, are described hereinafter in connection with the drawings to facilitate understanding. The example embodiments are illustrative only. Therefore, it will be appreciated by those having ordinary skill in the art that various changes and modifications may be made to the embodiments described herein without departing from the scope and spirit of the present application. Similarly, description of well-known functions and constructions is omitted hereinafter for clarity and conciseness.

Figure 1:
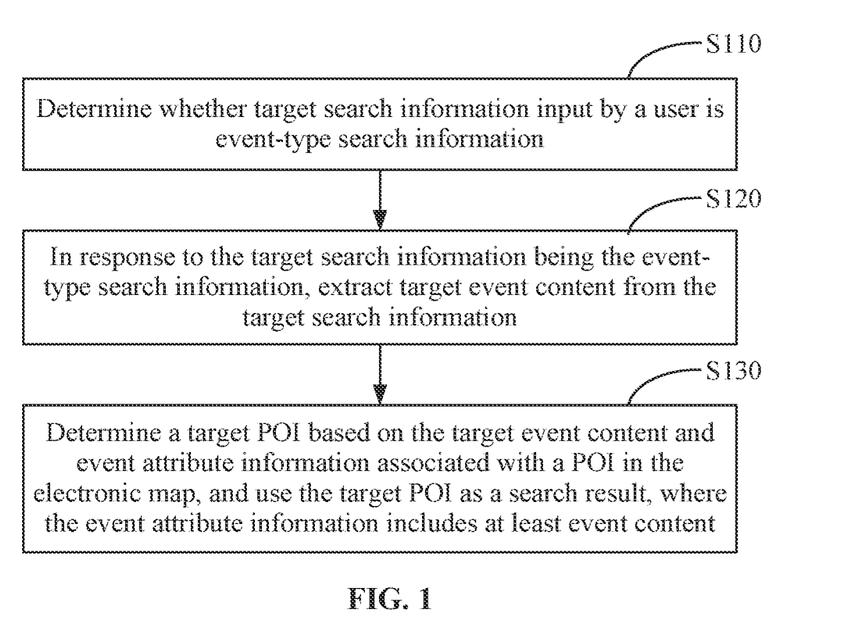
FIG. 1 is a flowchart of a search method for an electronic map according to an embodiment of the present application.

FIG. 1 is a flowchart of a search method for an electronic map according to an embodiment of the present application. This embodiment is applicable to the case where a search is performed based on an electronic map. Typically, this embodiment is applicable to the case where event-type search information is searched for based on an electronic map so that POI information is obtained. The search method for an electronic map disclosed in this embodiment may be performed by a search apparatus for an electronic map. The apparatus may be implemented in software and/or hardware. Referring to FIG. 1, the search method for an electronic map provided in this embodiment includes the steps below.

In S110, it is determined whether target search information input by a user is event-type search information.

The target search information may be information input by the user through the electronic map. The user input mode is not limited in this embodiment. The input mode may be, for example, voice input or manual input. The event-type search information may be search information including an event held. For example, "Zhang San's concert" is event-type search information including the content of the event held and corresponding to a holding location; "Zhang San's new song" corresponds to no holding location and thus is not event-type search information.

Specifically, the target search information input by the user through the electronic map may not be event-type search information and does not correspond to a holding location in the electronic map. As a result, the target POI in the electronic map cannot be retrieved through the target search information. In this embodiment of the present application, after the target search information input by the user is received, it is determined whether the target search information is event-type search information so that the target search information is screened. A response search is performed on target search information that is event-type search information so that the corresponding target POI is displayed. Whether the target search information is event-type search information may be determined based on event template matching. The target search information is screened so that the response speed is improved. For non-event-type search information, a search result can be returned accurately so that the user experience is improved.

In S120, in response to the target search information being the event-type search information, target event content is extracted from the target search information.

The target event content may be the content of the event held included in the target search information. For example, in the target search information "searching for the holding location of Zhang San's concert", the target event content is "Zhang San's concert".

In S130, a target POI is determined based on the target event content and event attribute information associated with a POI in the electronic map, and the target POI is used as a search result. The event attribute information includes at least event content.

The event attribute information may include information such as event content and time. The electronic map includes POIs (point of interests). Each POI may be associated with event attribute information. The information about each POI includes holding location information of the time corresponding to the event attribute information, for example, the host city and the address.

Based on the target event content in the target search information, event attribute information including event content related to the target event content is retrieved from the event attribute information associated with the POI in the electronic map so that the POI associated with the event attribute information is determined. This POI is used as the target POI so that the holding location information of the event corresponding to the target event content is displayed.

Optionally, before the target POI is obtained, the time corresponding to the target event content is obtained from a map database and it is determined whether the time corresponding to the target event content is earlier than the current time. If the time corresponding to the target event content is earlier than the current time, retrieval of the POI corresponding to the target event content is stopped. If the time corresponding to the target event content is later than the current time, determination of the target POI based on the target event content is continued.

In the technical solution of this embodiment of the present application, whether the target search information is the event-type search information is determined, and the POI service is provided for the event-type search information, so that the electronic map can satisfy the requirements for retrieval of the holding location of the event, the POI in the electronic map associated with the event-type search information can be obtained based on the event-type search information, and thus event-related location information can be displayed to the user.

Figure 2:
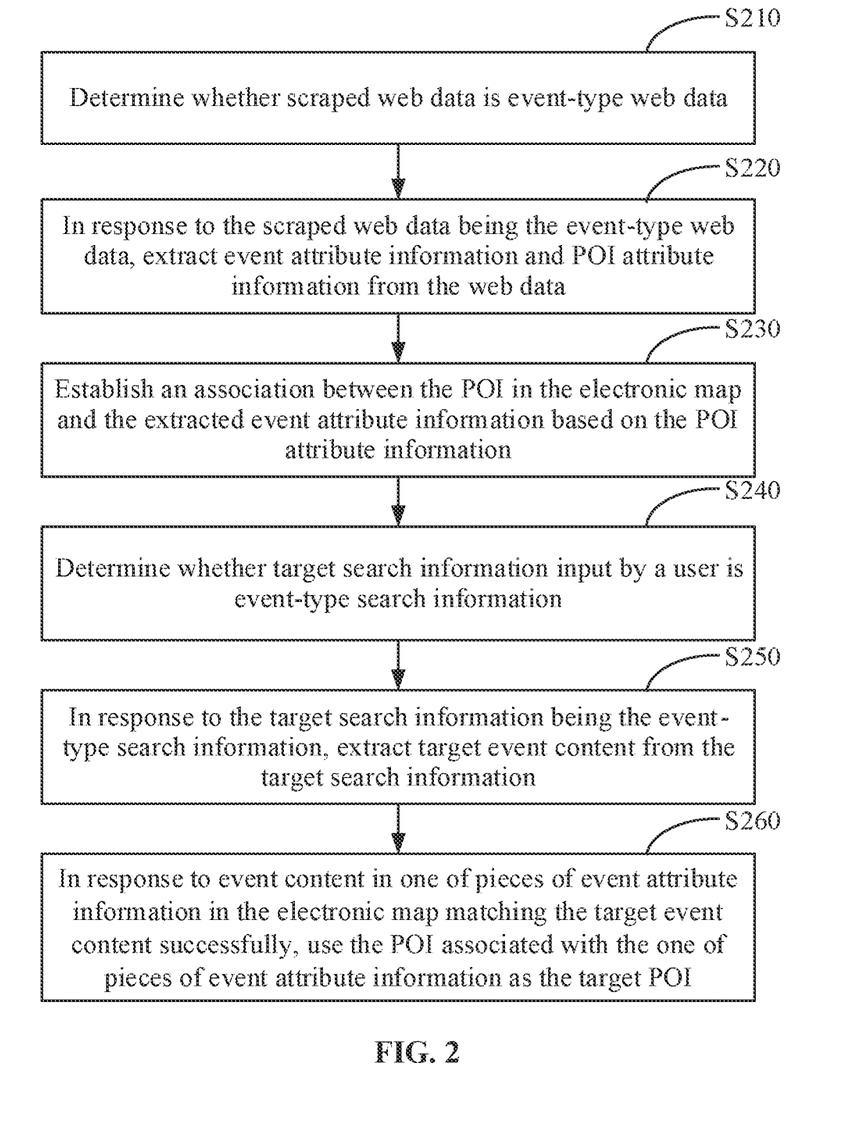
FIG. 2 is a flowchart of another search method for an electronic map according to an embodiment of the present application.

FIG. 2 is a flowchart of another search method for an electronic map according to an embodiment of the present application. This embodiment is an optional solution provided based on the preceding embodiment. Referring to FIG. 2, the search method for an electronic map provided in this embodiment includes the steps below.

In S210, it is determined whether scraped web data is event-type web data.

The web data may be text information such as a web article, a news report or a star blog. The web data includes a large amount of real-time data. In the web data, the title or the first paragraph often includes information about an event. Therefore, event information and holding location information can be acquired from the web data through scraping of the web data, facilitating subsequent display through the electronic map. Event-type web data may be web data including an event held, for example, "Zhang San will hold a concert at a workers' stadium of a certain city on May 20, 2022". It is determined whether the web data is event-type web data so that the web data is screened. In this manner, valueless web data not including event content is filtered out, web data from which key event information can be extracted is retained, and thus resources are utilized and processed reasonably and effectively.

Optionally, determining whether the scraped web data is the event-type web data includes determining that the web data is the event-type web data in response to detecting, based on template matching, that the scraped web data includes event information, time and location information; otherwise, determining that the web data is not the event-type web data.

For example, a text rule matching template library including three elements: event, time and location is constructed, and then matching is performed based on the template in the template library so that it is determined whether the web data includes the three elements. If the web data includes the three elements, the web data is valuable web data applicable to extraction of event information. If the web data does not include the three elements, the web data is not valuable web data applicable to extraction of event information and thus is filtered out. For example, it is determined, based on template matching, that the web data "Zhang San will hold a concert at the workers' stadium located at No. 7, First Avenue in a certain city on May 20, 2022" includes the three elements, that is, the event "Zhang San's concert", the time "May 20, 2022" and the location "No. 7, First Avenue" and thus is event-type web data. As another example, the web data "Zhang San's latest single is about to be released" includes only the event "Zhang San's latest single is about to be released" and does not include the time and location of the event, that is, does not include all of the three elements, and thus is not event-type web data. It is determined, based on template matching, whether the web data includes the three elements so that screening is performed. In this manner, valuable web data is obtained comprehensively and accurately, and information such as event, time and location is extracted from the web data.

In S220, in response to the scraped web data being the event-type web data, event attribute information and POI attribute information are extracted from the web data.

Figure 3:
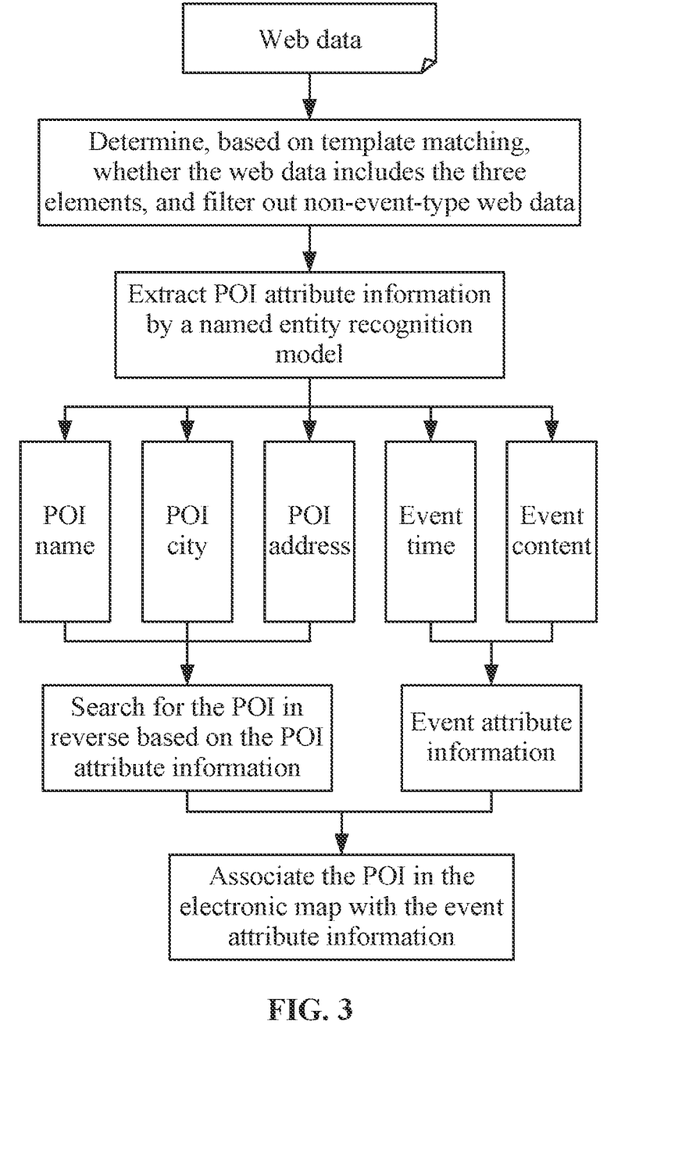
FIG. 3 is a schematic diagram illustrating an association between a POI and event attribute information according to an embodiment of the present application.

The event attribute information may include event content and event time. The POI attribute information may include a POI name, a POI city and a POI address. For example, as shown in FIG. 3, after valueless web data is filtered out and event-type web data is obtained, the content, time, POI name, POI city and POI address of an event are extracted from the event-type web data so that event-related information is obtained comprehensively. Entities in the event-type web data may be recognized based on a conditional random field (CRF) model so that the POI name, the POI city and the POI address are extracted from the event-type web data. Optionally, a training sample prediction sample including five elements: event content, event time, a POI name, a POI city and a POI address is determined by manual marking, the CRF model is trained by using the prediction sample, the prediction sample is predicted based on the trained CRF model, and then iteration is performed on incorrectly predicted data so that the CRF model is perfected. In this manner, a POI information recognition model is obtained. POI information is recognized based on the obtained model. For example, it is recognized from the event-type web data "Zhang San will hold a concert at the workers' stadium located at No. 7, First Avenue in a certain city on May 20, 2022" that the event content is "Zhang San's concert", the event time is "May 20, 2022", the POI name is "workers' stadium", the POI city is "a certain city", and the POI address is "No. 7, First Avenue".

In S230, an association between the POI in the electronic map and the extracted event attribute information is established based on the POI attribute information.

For example, the POI in the electronic map is determined based on the POI name, the POI address and the POI city, and the POI in the electronic map is associated with the event attribute information so that the POI located in the electronic map and corresponding to the event can be subsequent determined based on the association.

Optionally, the event attribute information further includes event time. Accordingly, the method further includes removing, in response to detecting that event time in one of pieces of event attribute information is earlier than the current time, the one of pieces of event attribute information or the association between the POI in the electronic map and the one of pieces of event attribute information.

For example, the event attribute information is extracted from the event-type web data, and it is determined whether the event time in the extracted event attribute information is earlier than the current time; if the event time is earlier than the current time, the event-type web data has expired, and thus the event attribute information is removed; alternatively, if it is determined, based on the event attribute information in the association, that the event time in the event attribute information in the association is earlier than the current time, indicating that the event has been held, and thus the association is removed. The POI of the expired event is no longer displayed when a user inputs event-type search information.

Optionally, before establishing the association between the POI in the electronic map and the event attribute information based on the POI attribute information, the method further includes cross-validating a POI name, a POI city and a POI address in the POI attribute information; and in response to a validation failure, filtering out the POI attribute information.

For example, it is determined, based on the electronic map, whether the city and address corresponding to the POI name are consistent with the recognized POI city and POI address. If the city and address corresponding to the POI name are consistent with the recognized POI city and POI address, the validation succeeds. If the city and address corresponding to the POI name are inconsistent with the recognized POI city and POI address, the validation fails, indicating that the POI name does not correspond to the POI city and the POI address, the information needs to be discarded, and re-recognition is required.

In S240, it is determined whether target search information input by a user is event-type search information.

In S250, in response to the target search information being the event-type search information, target event content is extracted from the target search information.

In S260, in response to event content in one of pieces of event attribute information in the electronic map matching the target event content successfully, the POI associated with the one of pieces of event attribute information is used as the target POI.

For example, the target event content extracted from the target search information is matched with the event content in the event attribute information in the electronic map so that the event attribute information matching the target event content is determined, and then the POI associated with the event attribute information is used as the target POI search result and provided for the user. In this manner, the POI of the electronic map is searched for based on the input event-type search information, thereby enriching the search function of the electronic map and facilitating the operation of the user.

In this embodiment of the present application, it is determined whether scraped web data is event-type web data; in response to the scraped web data being the event-type web data, event attribute information and POI attribute information are extracted from the web data; and an association between the POI in the electronic map and the extracted event attribute information is established based on the POI attribute information so that the search result corresponding to the target search information can be subsequently determined based on the association. In this embodiment of the present application, it is determined whether target search information is event-type search information, and in response to the event content in the event attribute information in the electronic map matching the target event content successfully, the POI associated with the event attribute information is used as the target POI so that the POI in the electronic map is searched for based on the event, thereby enriching the search function of the electronic map and facilitating the application of the electronic map by the user.

Figure 4:
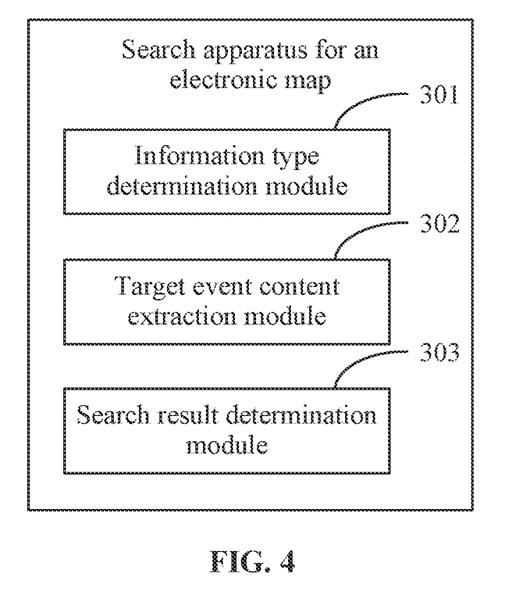
FIG. 4 is a structure diagram of a search apparatus for an electronic map according to an embodiment of the present application.

FIG. 4 is a structure diagram of a search apparatus for an electronic map according to an embodiment of the present application. Referring to FIG. 4, an embodiment of the present application discloses a search apparatus 300 for an electronic map. The apparatus 300 includes an information type determination module 301, a target event content extraction module 302 and a search result determination module 303.

The information type determination module 301 is configured to determine whether target search information input by a user is event-type search information.

The target event content extraction module 302 is configured to extract, in response to the target search information being the event-type search information, target event content from the target search information.

The search result determination module 303 is configured to determine a target POI based on the target event content and event attribute information associated with a POI in the electronic map and use the target POI as a search result. The event attribute information includes at least event content.

In this embodiment of the present application, the apparatus further includes a web data type determination module, an attribute information determination module and an association determination module.

The web data type determination module is configured to determine whether scraped web data is event-type web data.

The attribute information determination module is configured to extract, in response to the scraped web data being the event-type web data, event attribute information and POI attribute information from the web data.

The association determination module is configured to establish an association between the POI in the electronic map and the extracted event attribute information based on the POI attribute information.

In this embodiment of the present application, the web data type determination module includes a first determination unit and a second determination unit.

The first determination unit is configured to determine that the web data is the event-type web data in response to detecting, based on template matching, that the scraped web data includes event information, time and location information.

The second determination unit is configured to: otherwise, determine that the web data is not the event-type web data.

In this embodiment of the present application, the event attribute information further includes event time.

Accordingly, the apparatus further includes a removal module.

The removal module is configured to remove, in response to detecting that event time in one of pieces of event attribute information is earlier than the current time, the one of pieces of event attribute information or the association between the POI in the electronic map and the one of pieces of event attribute information.

In this embodiment of the present application, the apparatus further includes a cross-validation module and a filtering module.

The cross-validation module is configured to cross-validate a POI name, a POI city and a POI address in the POI attribute information.

The filtering module is configured to filter out the POI attribute information in response to a validation failure.

In this embodiment of the present application, the search result determination module 303 includes a matching unit.

The matching unit is configured to use, in response to event content in one of pieces of event attribute information in the electronic map matching the target event content successfully, the POI associated with the one of pieces of event attribute information as the target POI.

The search apparatus for an electronic map provided in this embodiment of the present application can execute the search method for an electronic map provided in any one of embodiments of the present application and has function modules and beneficial effects corresponding to the executed method.

According to an embodiment of the present application, the present application further provides an electronic device and a readable storage medium.

Figure 5:
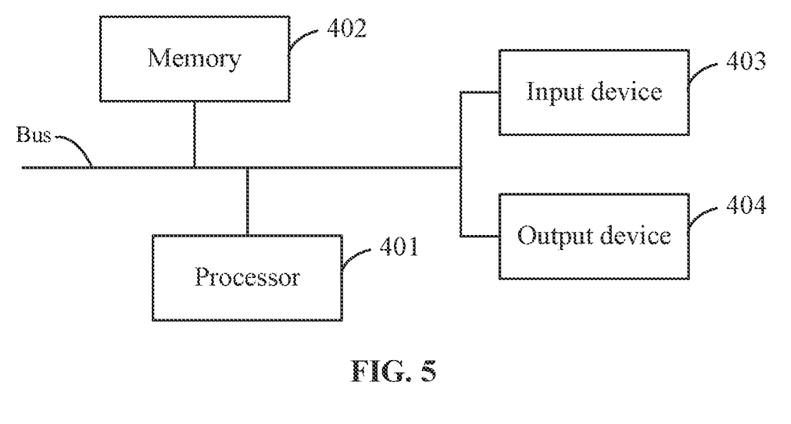
FIG. 5 is a block diagram of an electronic device for implementing a search method for an electronic map according to an embodiment of the present application.

As shown in FIG. 5, FIG. 5 is a block diagram of an electronic device for implementing a search method for an electronic map according to an embodiment of the present application. Electronic devices are intended to represent various forms of digital computers, for example, laptop computers, desktop computers, worktables, personal digital assistants, servers, blade servers, mainframe computers and other applicable computers. Electronic devices may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present application as described and/ or claimed herein.

As shown in FIG. 5, the electronic device includes one or more processors 401, a memory 402, and interfaces for connecting components, including a high-speed interface and a low-speed interface. The components are interconnected to each other by different buses and may be mounted on a common mainboard or in other manners as desired. The processor may process instructions executed in the electronic device, including instructions stored in or on the memory to make graphic information of a GUI displayed on an external input/output device (for example, a display device coupled to an interface). In other embodiments, if required, multiple processors and/or multiple buses may be used with multiple memories and multiple memories. Similarly, multiple electronic devices may be connected, providing some necessary operations (for example, serving as a server array, a set of blade servers or a multi-processor system). FIG. 5 shows one processor 401 by way of example.

The memory 402 is the non-transitory computer-readable storage medium provided in the present application. The memory stores instructions executable by at least one processor to cause the at least one processor to perform the search method for an electronic map provided in the present application. The non-transitory computer-readable storage medium of the present application stores computer instructions for causing a computer to perform the search method for an electronic map provided in the present application.

The memory 402 as a non-transitory computer-readable storage medium is configured to store a non-transitory software program, a non-transitory computer-executable program, and modules, for example, program instructions/ modules corresponding to the search method for an electronic map provided in embodiments of the present application (for example, the information type determination module 301, the target event content extraction module 302 and the search result determination module 303 shown in FIG. 4). The processor 401 executes non-transitory software programs, instructions and modules stored in the memory 402 to execute the various function applications and data processing of a server, that is, implement the search method for an electronic map provided in the preceding method embodiments.

The memory 402 may include a program storage region and a data storage region. The program storage region may store an operating system and an application program required by at least one function. The data storage region may store data created based on the use of the electronic device for search of an electronic map. Additionally, the memory 402 may include a high-speed random-access memory and a non-transient memory, for example, at least one disk memory, a flash memory or another non-transient solid-state memory. In some embodiments, the memory 402 optionally includes memories disposed remote from the processor 401, and these remote memories may be connected, through a network, to the electronic device for search of an electronic map. Examples of the preceding network include, but are not limited to, the Internet, an intranet, a local area network, a mobile communication network and a combination thereof.

The electronic device for the search method for an electronic map may include an input device 403 and an output device 404. The processor 401, the memory 402, the input device 403 and the output device 404 may be connected by a bus or in other manners. FIG. 5 uses connection by a bus as an example.

The input device 403 may receive input number or character information and generate key signal input related to user settings and function control of the electronic device for search of an electronic map. The input device 403 may be, for example, a touchscreen, a keypad, a mouse, a trackpad, a touchpad, a pointing stick, one or more mouse buttons, a trackball or a joystick. The output device 404 may be, for example, a display device, an auxiliary lighting device (for example, an LED) or a haptic feedback device (for example, a vibration motor). The display device may include, but is not limited to, a liquid-crystal display (LCD), a light-emitting diode (LED) display or a plasma display. In some embodiments, the display device may be a touchscreen.

The various embodiments of the systems and techniques described herein may be implemented in digital electronic circuitry, integrated circuitry, an application-specific integrated circuit (ASIC), computer hardware, firmware, software and/or a combination thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

These computing programs (also referred to as programs, software, software applications or codes) include machine instructions of a programmable processor. These computing programs may be implemented in a high-level procedural and/or object-oriented programming language and/or in an assembly/machine language. As used herein, the term "machine-readable medium" or "computer-readable medium" refers to any computer program product, device and/or apparatus (for example, a magnetic disk, an optical disk, a memory or a programmable logic device (PLD)) for providing machine instructions and/or data for a programmable processor, including a machine-readable medium for receiving machine instructions as machine-readable signals. The term "machine-readable signal" refers to any signal used in providing machine instructions and/or data for a programmable processor.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other.

It is to be understood that various forms of the preceding flows may be used, with steps reordered, added or removed. For example, the steps described in the present application may be executed in parallel, in sequence or in a different order as long as the desired result of the technical solution disclosed in the present application is achieved. The execution sequence of these steps is not limited herein.

The scope of the present application is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present application are within the scope of the present application.

What is claimed is:

1. A search method for an electronic map, applied to an electronic device, wherein the electronic device comprises a processor, a memory, an input device and an output device connected by a bus, and the method comprises:

determining, by the processor, whether target search information input by a user on the electronic map through the input device is event-type search information, wherein the event-type search information refers to search information including an event held;

in response to the target search information being the event-type search information, extracting by the processor, target event content from the target search information, wherein the target event content refers to content of the event held; and     determining, by the processor, a target point of interest (POI) based on the content of the event held and event attribute information associated with a POI in the electronic map, and using, by the processor, the target POI as a search result for displaying, through the output device, holding location information of the event held;

before determining, by the processor, whether the target search information input by the user on the electronic map through the input device is the event-type search information, the method further comprises:

scraping, by the processor, web data and determining, by the processor, whether the scraped web data is event-type web data;

in response to the scraped web data being the event-type web data, extracting, by the processor, the event attribute information and POI attribute information from the web data; and establishing, by the processor, an association between the POI in the electronic map and the extracted event attribute information based on the POI attribute information;

wherein the event attribute information comprises event content and event time; and wherein the POI attribute information comprises a POI name, a POI city and a POI address.

2. The method of claim 1, wherein determining, by the processor, whether the scraped web data is the event-type web data comprises:

in response to detecting, based on template matching, that the scraped web data comprises event information, time and location information, determining, by the processor, that the web data is the event-type web data; or in response to detecting, based on template matching, that the scraped web data comprises none or at most two of event information, time or location information, determining, by the processor, that the web data is not the event-type web data.

3. The method of claim 1, the method further comprises:

in response to detecting that event time in the event attribute information is earlier than current time, removing, by the processor, the event attribute information or removing, by the processor, the association between the POI in the electronic map and the event attribute information.

4. The method of claim 1, before establishing, by the processor, the association between the POI in the electronic map and the extracted event attribute information based on the POI attribute information, further comprising:

cross-validating, by the processor, the POI name, the POI city and the POI address in the POI attribute information; and in response to a validation failure, filtering out, by the processor, the POI attribute information.

5. The method of claim 1, wherein determining, by the processor, the POI based on the content of the event held target event content and the event attribute information associated with the POI in the electronic map comprises:

in response to event content in the event attribute information in the electronic map matching the content of the event held successfully, using, by the processor, the POI associated with the event attribute information as the target POI.

6. An electronic device, comprising:

at least one processor; and a memory, an input device and an output device connected to the at least one processor for communication, wherein the memory stores instructions executable by the at least one processor, the at least one processor is configured to determine whether target search information input by a user on the electronic map through the input device is event-type search information, wherein the event-type search information refers to search information including an event held;

in response to the target search information being the event-type search information, the at least one processor is configured to extracting target event content from the target search information, wherein the target event content refers to content of the event held;

the at least one processor is configured to determine a target point of interest (POI) based on the content of the event held and event attribute information associated with a POI in the electronic map, and to use the target POI as a search result for displaying, through the output device, holding location information of the event held;

the at least one processor is further configured to scrape web data and to determine whether the scraped web data is event-type web data before the processor determines whether the target search information input by the user on the electronic map through the input device is the event-type search information;

in response to the scraped web data being the event-type web data, the at least one processor is configured to extract the event attribute information and POI attribute information from the web data: and the at least one processor is configured to establish an association between the POI in the electronic map and the extracted event attribute information based on the POI attribute information;

wherein the event attribute information comprises event content and event time; and wherein the POI attribute information comprises a POI name, a POI city and a POI address.

7. The device of claim 6, wherein in response to detecting, based on template matching, that the scraped web data comprises event information, time and location information, the at least one processor is configured to determine that the web data is the event-type web data; or in response to detecting, based on template matching, that the scraped web data comprises none or at most two of event information, time or location information, the at least one processor is configured to determine that the web data is not the event-type web data.

8. The device of claim 6 wherein in response to detecting that event time in the event attribute information is earlier than current time, the at least one processor is configured to remove the event attribute information or to remove the association between the POI in the electronic map and the event attribute information.

9. The device of claim 6, wherein the at least one processor is configured to cross-validat the POI name, the POI city and the POI address in the POI attribute information before the at least one processor establishes the association between the POI in the electronic map and the extracted event attribute information based on the POI attribute information; and in response to a validation failure, the at least one processor is configured to filter out the POI attribute information.

10. The device of claim 6, wherein in response to event content in the event attribute information in the electronic map matching the content of the event held successfully, the at least one processor is configured to use the POI associated with the event attribute information as the target POI.

11. A non-transitory computer-readable storage medium, storing computer instructions, wherein the computer instructions are used for causing a computer to perform the following steps:

determining whether target search information input by a user on the electronic map through the input device is event-type search information, wherein the event-type search information refers to search information including an event held;

in response to the target search information being the event-type search information, extracting target event content from the target search information, wherein the target event content refers to content of the event held; and determining a target point of interest (POI) based on the content of the event held and event attribute information associated with a POI in the electronic map and using the target POI as a search result for displaying, through the output device, holding location information of the event held;

before determining whether the target search information input by the user on the electronic map through the input device is the event-type search information, further comprising:

scraping web data and determining whether the scraped web data is event-type web data;

in response to the scraped web data being the event-type web data, extracting the event attribute information and POI attribute information from the web data; and establishing an association between the POI in the electronic map and the extracted event attribute information based on the POI attribute information;

wherein the event attribute information comprises event content and event time; and wherein the POI attribute information comprises a POI name, a POI city and a POI address.

12. The storage medium of claim 11, wherein the computer instructions are used for causing the computer to further perform the following steps:

in response to detecting, based on template matching, that the scraped web data comprises event information, time and location information, determining that the web data is the event-type web data; or in response to detecting, based on template matching, that the scraped web data comprises none or at most two of event information, time or location information, determining that the web data is not the event-type web data.

13. The storage medium of claim 11, wherein the computer instructions are used for causing the computer to further perform the following steps:

in response to detecting that event time in the event attribute information is earlier than current time, removing the event attribute information or removing the association between the POI in the electronic map and the event attribute information.

14. The storage medium of claim 11, wherein the computer instructions are used for causing the computer to further perform, before establishing the association between the POI in the electronic map and the extracted event attribute information based on the POI attribute information, the following steps:

cross-validating the POI name, the POI city and the POI address in the POI attribute information; and in response to a validation failure, filtering out the POI attribute information.

15. The storage medium of claim 11, wherein the computer instructions are used for causing the computer to further perform the following steps:

in response to event content in the event attribute information in the electronic map matching the content of the event held target event content successfully, using the POI associated with the event attribute information as the target POI.

\* \* \* \* \*